(12) United States Patent
Yoshida et al.

(10) Patent No.: US 10,015,592 B2
(45) Date of Patent: Jul. 3, 2018

(54) ACOUSTIC SIGNAL PROCESSING APPARATUS, METHOD OF PROCESSING ACOUSTIC SIGNAL, AND STORAGE MEDIUM

(71) Applicants: Minoru Yoshida, Kanagawa (JP); Akihito Aiba, Kanagawa (JP)

(72) Inventors: Minoru Yoshida, Kanagawa (JP); Akihito Aiba, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/592,637

(22) Filed: May 11, 2017

(65) Prior Publication Data
US 2017/0339488 A1    Nov. 23, 2017

(30) Foreign Application Priority Data

May 20, 2016 (JP) .................... 2016-101736
Mar. 2, 2017 (JP) .................... 2017-039697

(51) Int. Cl.
| H04R 3/00 | (2006.01) |
| H04S 7/00 | (2006.01) |
| H04R 1/40 | (2006.01) |
| G10L 21/0216 | (2013.01) |

(52) U.S. Cl.
CPC .......... *H04R 3/005* (2013.01); *G10L 21/0216* (2013.01); *H04R 1/406* (2013.01); *H04S 7/303* (2013.01); *G10L 2021/02166* (2013.01); *H04R 2201/401* (2013.01); *H04R 2430/21* (2013.01); *H04S 2400/15* (2013.01)

(58) Field of Classification Search
CPC .... H04R 25/405; H04R 25/407; H04R 25/50; H04R 25/505; H04R 25/552; H04R 1/1091; H04R 1/222; H04R 1/406; H04R 3/005
See application file for complete search history.

(56) References Cited

U.S. PATENT DOCUMENTS

| 2010/0303254 A1* | 12/2010 | Yoshizawa ............ G01S 3/8083 381/92 |
| 2015/0071455 A1* | 3/2015 | Tzirkel-Hancock .... G10L 15/20 381/73.1 |
| 2015/0098587 A1 | 4/2015 | Aiba et al. |
| 2017/0061990 A1* | 3/2017 | Otani ...................... G10L 25/57 |
| 2017/0221500 A1* | 8/2017 | Glasgow ............. G10L 19/0204 |

FOREIGN PATENT DOCUMENTS

| JP | 2002-091469 | 3/2002 |
| WO | WO2010/079526 A1 | 7/2010 |

* cited by examiner

*Primary Examiner* — Mohammad Islam
(74) *Attorney, Agent, or Firm* — Oblon, McClelland, Maier & Neustadt, L.L.P.

(57) ABSTRACT

An acoustic signal processing apparatus includes circuitry to generate, when a plurality of sound receivers receive sound from a plurality of examination directions in a space and outputs acoustic signals of a plurality of channels, an effective signal corresponding to sound coming from each one of the examination directions based on the acoustic signals of the plurality of channels for each one of the examination directions, calculate a feature for each one of the examination directions based on the effective signal generated for each one of the examination directions, and select a target direction from the plurality of examination directions in the space based on the feature calculated for each one of the examination directions.

10 Claims, 10 Drawing Sheets

ACOUSTIC SIGNAL PROCESSING APPARATUS, METHOD OF PROCESSING ACOUSTIC SIGNAL, AND STORAGE MEDIUM

CROSS-REFERENCE TO RELATED APPLICATION

This application claims priority pursuant to 35 U.S.C. § 119(a) to Japanese Patent Application Nos. 2016-101736, filed on May 20, 2016 and 2017-039697, filed on Mar. 2, 2017, in the Japan Patent Office, the disclosure of which is incorporated by reference herein in its entirety.

BACKGROUND

Technical Field

This disclosure relates to an acoustic signal processing apparatus, a method of processing an acoustic signal, and a storage medium.

Background Art

Teleconference systems such as audio conference system and video conference system used for an audio communication between a plurality of persons, which may be present at different locations, includes microphones to collect sound such as human voice, and then transmits audio signals to a communication partner to implement the audio communication between the plurality of persons or communication partners. The audio communication can be implemented smoothly by collecting human voices spoken by the plurality of persons with a higher precision. Conventionally, human voices spoken by the plurality of persons is collected by disposing directional microphones near conference participants, and turning ON the directional microphone disposed near a speaking person.

Further, human voices spoken by the plurality of persons is collected by disposing microphones at a plurality of positions, and mixing output signals of all of the microphones. However, as to conventional methods, microphones collect noise sounds such as sound of flipping paper and sound of moving chairs, and transmits the collected noise sounds to the communication partner, which is not preferable.

SUMMARY

As one aspect of present disclosure, an acoustic signal processing apparatus is devised. The acoustic signal processing apparatus includes circuitry to generate, when a plurality of sound receivers receive sound from a plurality of examination directions in a space and outputs acoustic signals of a plurality of channels, an effective signal corresponding to sound coming from each one of the examination directions based on the acoustic signals of the plurality of channels for each one of the examination directions, calculate a feature for each one of the examination directions based on the effective signal generated for each one of the examination directions, and select a target direction from the plurality of examination directions in the space based on the feature calculated for each one of the examination directions.

As another aspect of present disclosure, a method of processing an acoustic signal is devised. The method includes receiving acoustic signals of a plurality of channels from a plurality of sound receivers when the plurality of sound receivers receives sound coming from a plurality of examination directions in a space, generating an effective signal corresponding to sound coming from each one of the examination directions based on the acoustic signals of the plurality of channels for each one of the examination directions, calculating a feature for each one of the examination directions based on the effective signal generated for each one of the examination directions, and selecting a target direction from the plurality of examination directions in the space based on the feature calculated for each one of the examination directions.

As another aspect of present disclosure, a non-transitory storage medium storing a program that, when executed by a computer, causes the computer to execute a method of processing an acoustic signal is devised. The method includes receiving acoustic signals of a plurality of channels from a plurality of sound receivers when the plurality of sound receivers receives sound coming from a plurality of examination directions in a space, generating an effective signal corresponding to sound coming from each one of the examination directions based on the acoustic signals of the plurality of channels for each one of the examination directions, calculating a feature for each one of the examination directions based on the effective signal generated for each one of the examination directions, and selecting a target direction from the plurality of examination directions in the space based on the feature calculated for each one of the examination directions.

BRIEF DESCRIPTION OF THE DRAWINGS

A more complete appreciation of the description and many of the attendant advantages and features thereof can be readily obtained and understood from the following detailed description with reference to the accompanying drawings, wherein.

Figure 1:
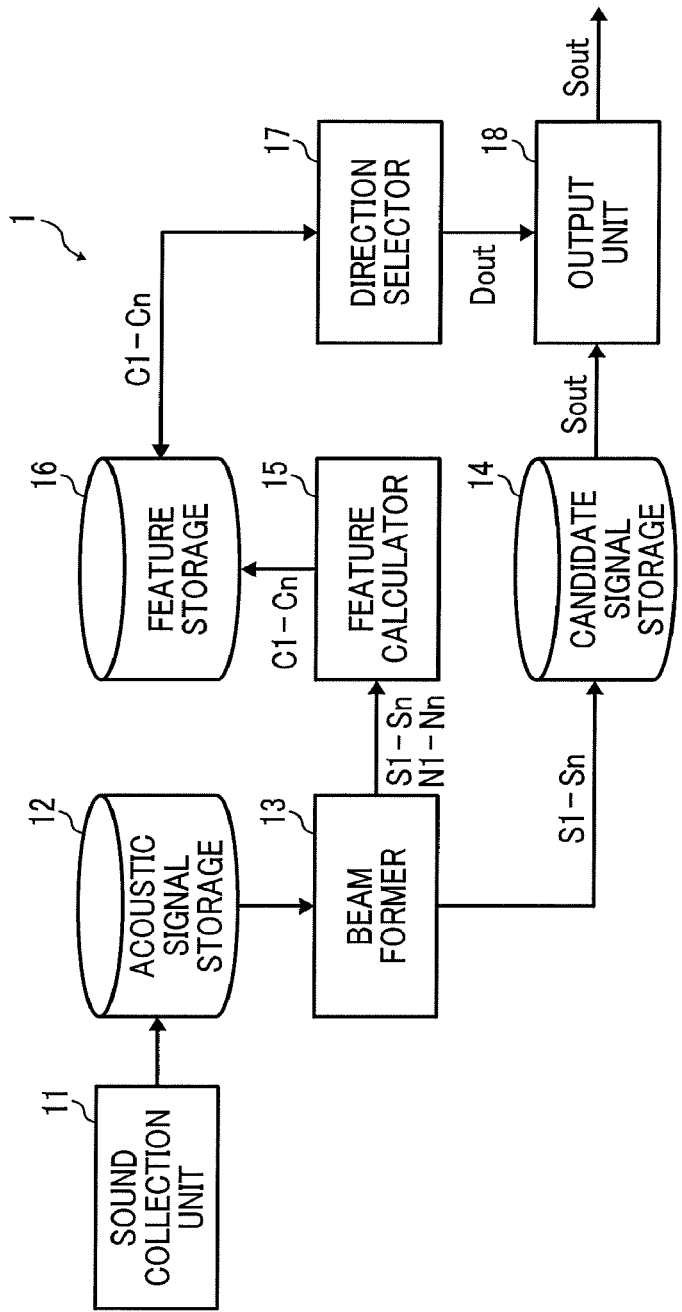
FIG. 1 is an example of a functional block diagram of an acoustic signal processing apparatus of a first embodiment.

The accompanying drawings are intended to depict exemplary embodiments of the present disclosure and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of embodiments of the present disclosure with reference to drawings. In this disclosure, components having the same or similar functional configuration among the embodiments of the present disclosure are assigned with the same references, and described by omitting the descriptions if redundant.

First Embodiment

A description is given of an acoustic signal processing apparatus 1 of a first embodiment with reference to FIGS. 1 to 6. The acoustic signal processing apparatus 1 collects sound coming from a plurality of directions by using a plurality of sound receivers such as omnidirectional microphones, performs given processing to acoustic signals of a plurality of channels output from the plurality of the omnidirectional microphones, determines whether a sound source exists, and selects or determines a target direction, which is a direction where a specific sound such as a target sound is output. The acoustic signal processing apparatus 1 can be applied to teleconference systems such as an audio conference system. In this description, the target direction indicates a direction where a sound source that outputs the specific sound exists, which means the target direction can be understood as a target sound direction. The omnidirectional microphone can collect sound coming from any directions in a space, which means the entire directions of the space. In this description, the plurality of apparatuses can be connected wirelessly or by wire as required.

(Configuration of Acoustic Signal Processing Apparatus)

FIG. 1 is an example of a functional block diagram of the acoustic signal processing apparatus 1 of the first embodiment. As illustrated in FIG. 1, the acoustic signal processing apparatus 1 includes, for example, a sound collection unit 11, an acoustic signal storage 12, a beam former 13, a candidate signal storage 14, a feature calculator 15, a feature storage 16, a direction selector 17, and an output unit 18.

The sound collection unit 11 collects sound coming from outside the acoustic signal processing apparatus 1, and outputs acoustic signals such as electrical signals corresponding to the collected sounds. The sound collection unit 11 has no directionality, which means the sound collection unit 11 can collect sound coming from the entire directions. To be described later, the sound collection unit 11 can be devised by a plurality of sound receivers such as omnidirectional microphones. Therefore, the sound collection unit 11 outputs the acoustic signals of a plurality of channels.

The acoustic signal storage 12 stores the acoustic signals of the plurality of channels output from the sound collection unit 11 for each of the channels. The acoustic signal storage 12 is configured by, for example, a ring buffer or a circular buffer having the first-in-first-out (FIFO) configuration.

The beam former 13 performs the beamforming process to the acoustic signals of the plurality of channels output from the sound collection unit 11. Specifically, the beamforming process includes one process that generates an effective signal S for an examination direction D based on the acoustic signals of the plurality of channels, and another process that generates a noise signal N for the examination direction D by setting a null point for the examination direction D based on the acoustic signals of the plurality of channels.

Figure 2:
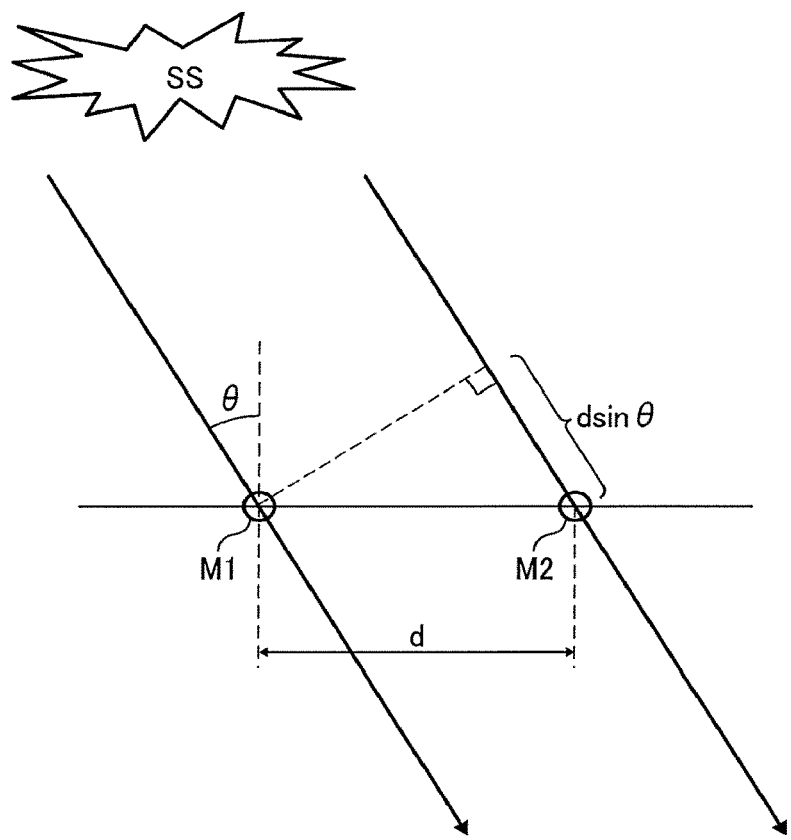
FIG. 2 illustrates an example of a microphone array including a first microphone and a second microphone disposed at respective positions distanced from a sound source.
Figure 3:
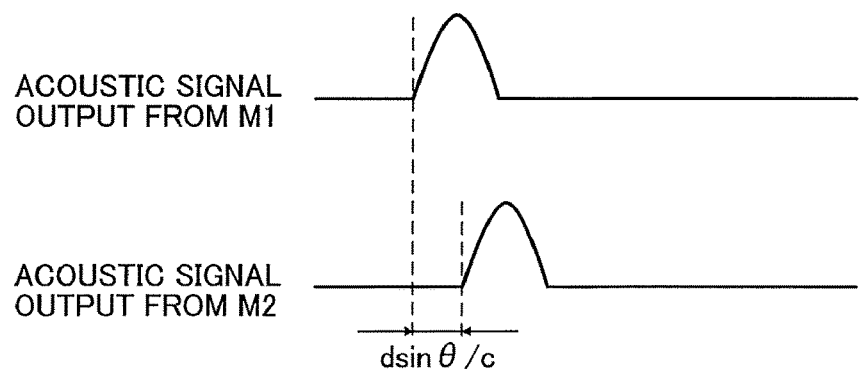
FIG. 3 illustrates an example of a first acoustic signal output from the first microphone, and a second acoustic signal output from the second microphone of FIG. 2.

A description is given of the beamforming process with reference to FIGS. 2 and 3. FIG. 2 illustrates an example of a microphone array including two microphones such as a first microphone M1 and a second microphone M2 are respectively disposed at a first position and a second position, each distanced from a sound source SS, in which a first distance is set as a distance between the sound source SS and the first microphone M1, and a second distance is set as a distance between the sound source SS and the second microphone M2. FIG. 3 illustrates an example of a first acoustic signal output from the first microphone M1, and a second acoustic signal output from the second microphone M2 of FIG. 2. The first microphone M1 and the second microphone M2 are, for example, omnidirectional microphones used as the sound receivers in this description.

As illustrated in FIG. 2, when the sound source SS exists at one examination direction D, sound coming from the sound source SS can be collected by the first microphone M1 and the second microphone M2. Since the first distance between the sound source SS and the first microphone M1 and the second distance between the sound source SS and the second microphone M2 are different, the sound coming from the sound source SS is received by the first microphone M1 and the second microphone M2 at different time points.

For example, in an example case of FIG. 2, the second distance between the sound source SS and the second microphone M2 is set longer that the first distance between the sound source SS and the first microphone M1 for "d sin θ," in which "d" denotes an installation interval of the first microphone M1 and the second microphone M2, and "θ" denotes an angle defined by a straight line (i.e., dotted line in FIG. 2) perpendicular to a line connecting the first microphone M1 and the second microphone M2, and a straight line extending from the sound source SS to the first microphone M1 or a straight line extending from the sound source SS to the second microphone M2.

Therefore, the sound coming from the sound source SS reaches the second microphone M2 later than the first microphone M1 for a delay time of "d sin θ/c," in which "c" denotes the sound speed. Therefore, as illustrated in FIG. 3, the second microphone M2 outputs a second acoustic signal corresponding to the sound coming from the sound source SS with the delay time of "d sin θ/c" relative to a first acoustic signal output from the first microphone M1.

In this configuration, an acoustic signal having increased a signal level (i.e., effective signal S) can be generated for the sound coming from the sound source SS by adding the first acoustic signal, output from the first microphone M1, to the second acoustic signal, output from the second microphone M2, by delaying the first acoustic signal for the time of d sin θ/c. Further, an acoustic signal having reduced a signal level (i.e., noise signal N) can be generated for the sound coming from the sound source SS by subtracting the first acoustic signal, output from the first microphone M1, from the second acoustic signal, output from the second microphone M2, by delaying the first acoustic signal for the delay time of d sin θ/c.

In this configuration, when the acoustic signals are output from the plurality of omnidirectional microphones, the beam former 13 adds one acoustic signal output from one omnidirectional microphone to another signal output from another omnidirectional microphone by delaying the one acoustic signal output from one omnidirectional microphone for a given delay time, set for the one acoustic signal output from the one omnidirectional microphone, to generate the effective signal S for each of the examination directions D.

Further, when the acoustic signals are output from the plurality of omnidirectional microphones, the beam former 13 subtracts one acoustic signal output from one omnidirectional microphone from another signal output from another omnidirectional microphone by delaying the one acoustic signal output from one omnidirectional microphone for the given delay time, set for the one acoustic signal output from the one omnidirectional microphone, to generate the noise signal N for each of the examination directions D.

In an example case of FIG. 2, it is assumed that the sound source SS exists at a position that is far enough from the first microphone M1 and the second microphone M2, in which the straight line extending from the sound source SS to the first microphone M1, and the straight line extending from the sound source SS to the second microphone M2 are substantial parallel with each other. In an example case of FIG. 2, the sound collection unit 11 is devised by two microphones such as the first microphone M1 and the second microphone M2, but not limited thereto. For example, the sound collection unit 11 can be devised by three or more microphones, which means the sound collection unit 11 can be devised by a plurality of microphones.

In this description, a plurality of directions are pre-set as the examination direction D. Hereinafter, it is assumed that each of the plurality of directions is set as the examination direction D by indicating each of the directions with the number "n" variable from one to "n" (i.e., first examination direction D1 to n-th examination direction Dn, in which the "i"-th examination direction D is expressed as the examination direction Di ($1 \leq i \leq n$). In an example case of FIG. 6, n=8 is set. Further, each of the examination directions D1 to Dn are different directions with each other. Further, the effective signal S and the noise signal N generated for the examination direction Di are respectively referred to as the effective signal Si and the noise signal Ni.

The effective signal Si is an acoustic signal corresponding to a sound coming from the examination direction Di. The effective signal Si can be generated by extracting the acoustic signal corresponding to the sound coming from the examination direction Di from acoustic signals output from the sound collection unit 11 corresponding to the sounds coming from the entire directions.

The beam former 13 generates the effective signal Si by adding a plurality of acoustic signals from a plurality of channels by delaying the timing of adding the plurality of acoustic signals for a respective delay time. Specifically, the beam former 13 generates the effective signal Si by adding one acoustic signal output from one omnidirectional microphone to another signal output from another omnidirectional microphone by delaying the one acoustic signal output from the one omnidirectional microphone for a given delay time. When the sound coming from one examination direction Di reaches the plurality of omnidirectional microphones, the plurality of omnidirectional microphones outputs the acoustic signals of the plurality of channels. To increase a signal level of acoustic signals for the sound coming from the one examination direction Di, the beam former 13 adds a plurality acoustic signals corresponding to the sound coming from the one examination direction Di by delaying one or more acoustic signals for a respective given delay time to generate the effective signal Si. The effective signal Si generated by the beam former 13 corresponds to an output value of an adder of a delay and sum beam former when a beam point (i.e., higher sensitivity direction) is set for the one examination direction Di.

The delay time of the acoustic signal is set for each of the examination direction Di in advance such that the phases of the sound coming from the examination direction Di are matched. As above described, the delay time can be set based on the installation interval "d" of the plurality of the omnidirectional microphones configuring the sound collection unit 11, the examination direction Di, and the installation positions of the plurality of the omnidirectional microphones that outputs the acoustic signals.

When the beam former 13 adds the acoustic signals of the plurality of channels by delaying one or more acoustic signals for the given delay time for one examination direction Di, the signal level of the acoustic signal of the one examination direction Di is increased. By contrast, even if the acoustic signals corresponding to sounds coming from directions other than the one examination direction Di are added by delaying one or more acoustic signals for the same delay time, the signal level of the acoustic signals acquired for the directions other than the one examination direction Di is not increased so much compared to the signal level of the acoustic signals acquired for the one examination direction Di. Therefore, the acoustic signal having the increased signal level is acquired for the one examination direction Di, and the beam former 13 outputs the acoustic signal having the increased signal level as the effective signal Si for the one examination direction Di.

The generation method of the effective signal Si is not limited to the above described method. For example, the beam former 13 can adjust the signal level of the acoustic signals of each of the channels by amplifying the acoustic signal of each of the channels before adding the acoustic signals of each of the channels, or the beam former 13 can filter the acoustic signals of each of the channels to remove a unnecessary frequency component.

The noise signal Ni for one examination direction Di is one or more acoustic signals corresponding to sounds coming from one or more examination directions other than the one examination direction Di. The noise signal Ni becomes a noise component for the one examination direction Di, which may be included in the effective signal Si of the one examination direction Di.

In the first embodiment, the noise signal Ni can be generated by removing the acoustic signal corresponding to the sound coming from one examination direction Di from the acoustic signals corresponding to the sounds coming from the entire directions, which are output from the sound collection unit 11, which means the noise signal Ni can be generated by acquiring the acoustic signals corresponding to the sounds coming from the directions other than the one examination direction Di by setting a null point (i.e., lower sensitivity direction) for the one examination direction Di.

Specifically, in the first embodiment, the beam former 13 generates the noise signal Ni by subtracting one acoustic signal output from one omnidirectional microphone from another signal output from another omnidirectional microphone by delaying the one acoustic signal for a given delay time set for the one acoustic signal output.

When the sound coming from the examination direction Di reaches the plurality of omnidirectional microphones, the plurality of omnidirectional microphones outputs the acoustic signals of the plurality of channels. The beam former 13 generates the noise signal Ni by subtracting the acoustic signals corresponding to the sound coming from the examination direction Di by respectively delaying the acoustic signals for a given delay time. The noise signal Ni generated by the beam former 13 corresponds to an output value of a subtractor of the delay and sum beam former when a null point is set for the examination direction Di. The delay time of the acoustic signal can be set same as the effective signal Si.

When the beam former 13 subtracts the acoustic signals of the plurality of channels as above described for one examination direction Di, the signal level of the acoustic signal of the one examination direction Di is decreased. By contrast, the signal level of the acoustic signal acquired for directions other than the one examination direction Di is not decreased so much compared to the signal level of the acoustic signals acquired for the one examination direction Di. Therefore, the acoustic signal having the decreased signal level is acquired for the one examination direction Di, and the beam former 13 outputs the acoustic signal having the decreased signal level as the noise signal Ni.

The generation method of the noise signal Ni is not limited to the above described method. For example, the beam former 13 can adjust a signal level of the acoustic signals of each of the channels by amplifying the acoustic signals of each of the channels before subtracting the acoustic signals of each of the channels, or the beam former 13 can filter the acoustic signal of each of the channels to remove a unnecessary frequency component.

The beam former 13 performs the beamforming process for each of the examination directions Di to respectively generate the effective signal Si and the noise signal Ni for each of the examination directions Di. The beam former 13 can perform the beamforming process for each of the examination directions Di sequentially or in parallel.

The candidate signal storage 14 stores a candidate signal of each of the examination directions Di. The candidate signal becomes a candidate of an output signal to be output from the output unit 18. In the first embodiment, the candidate signal storage 14 stores the effective signal Si of each of the examination directions Di generated by the beam former 13 as the candidate signal of each of the examination directions Di.

The feature calculator 15 calculates a feature C of each of the examination directions Di based on the effective signal Si and the noise signal Ni generated for each of the examination directions Di. Hereinafter, the feature C of the examination direction Di is referred to as a feature Ci. The feature Ci indicates a condition of sound for the examination direction Di, which is an acoustic feature that can be calculated from the effective signal Si and the noise signal Ni. The feature Ci can be the acoustic feature of time zone or the acoustic feature of frequency zone. When the feature Ci of the frequency zone is calculated, the feature calculator 15 preferably performs the fast fourier transform (FFT) to calculate the feature Ci with a shorter time.

The feature storage 16 stores the feature Ci of each of the examination directions Di calculated by the feature calculator 15.

The direction selector 17 determines whether a sound source exists for each of the examination directions Di based on the feature Ci calculated for each of the examination directions Di. Further, the direction selector 17 selects or determines a target direction Dout based on a result of a process of determining whether the sound source exists, and the feature Ci. The target direction Dout indicates one of the examination directions Di that corresponds to the candidate signal to be output from the output unit 18 as the output signal. The target direction Dout is any one of the examination directions D1 to Dn (i.e., n=2, 3, . . . ), and the target direction Dout is a direction where a specific sound (e.g., target sound) is output in this description.

Specifically, when the direction selector 17 determines that a sound source exists for one or more examination directions Di, the direction selector 17 selects one of the examination directions Di having the greatest acoustic signal level for the sound coming from the determined sound source, from the one or more examination directions Di that are respectively determined to have the sound source, as the target direction Dout.

By contrast, when the direction selector 17 determines that the sound source does not exist for any one of the examination directions Di, the direction selector 17 selects one of the examination directions Di having the smallest acoustic signal level among the examination directions D1 to Dn. In the first embodiment, the examination direction Di having the smallest noise signal Ni is selected as the target direction Dout.

The output unit 18 outputs the candidate signal of the target direction Dout as the output signal. In the first embodiment, since the candidate signal is the effective signal Si, the output unit 18 outputs the effective signal Sout for the target direction Dout as the output signal. When the output signal is output, the output unit 18 outputs the output signal, for example, to an external apparatus of the acoustic signal processing apparatus 1, or the output unit 18 outputs the output signal by using an acoustic sound output device (e.g., speaker) disposed for the acoustic signal processing apparatus 1.

Figure 4:
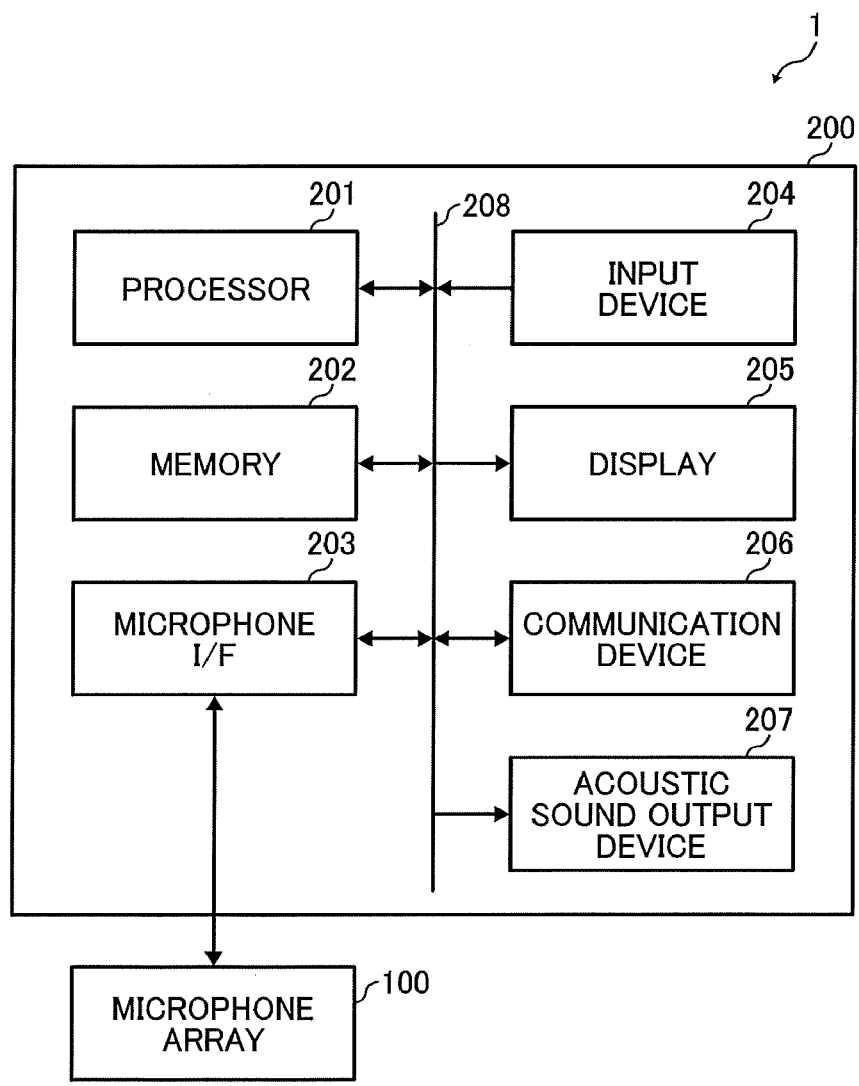
FIG. 4 is an example of a hardware block diagram of the acoustic signal processing apparatus of the first embodiment.

FIG. 4 is an example of a hardware block diagram of the acoustic signal processing apparatus 1 of the first embodiment. The acoustic signal processing apparatus 1 includes, for example, a microphone array 100, and an information processing apparatus 200.

The microphone array 100 includes a plurality of the omnidirectional microphones disposed by setting the installation interval "d" between each of the omnidirectional microphones, in which each of the omnidirectional microphones is connected to coupled to the information processing apparatus 200. Each one of the omnidirectional microphones of the microphone array 100 respectively outputs an acoustic signal corresponding to the sound collected or received by each one of the omnidirectional microphones. When the microphone array 100 includes "M" omnidirectional microphones (i.e., M is a natural number of two or more), the microphone array 100 outputs the acoustic signals of "M" channels. The sound collection unit 11 can be devised by the microphone array 100.

As illustrated in FIG. 4, the information processing apparatus 200 includes, for example, a processor 201, a memory 202, a microphone interface (I/F) 203, an input device 204, a display 205, a communication device 206, an acoustic sound output device 207, and a bus 208.

The processor 201 such as circuitry or processing circuits executes programs stored in the memory 202 to implement the beam former 13, the feature calculator 15, the direction selector 17, and the output unit 18 of the acoustic signal processing apparatus 1. The processor 201 is, for example, a central processing unit (CPU), a digital signal processor (DSP), an application specified integrated circuit (ASIC), a field programmable gate array (FPGA), a programmable logic device (PLD) or the like.

The memory 202 stores programs executable by the processor 201 and various data. The memory 202 can be used as the acoustic signal storage 12, the candidate signal storage 14, and the feature storage 16. The memory 202 is, for example, a random access memory (RAM), a dynamic random access memory (DRAM), a static random access memory (SRAM), a hard disk drive (HDD), an optical disk, a flash memory or the like.

The microphone I/F 203 is an interface used for communication between the microphone array 100 and the information processing apparatus 200. The microphone I/F 203 is, for example, an analog front end (AFE) including an analog to digital (AD) converter. The microphone I/F 203 converts an analog signal (i.e., acoustic signal) output by the microphone array 100 to a digital signal, and stores the digital signal in the memory 202. Further, the microphone I/F 203 inputs a control signal received from the processor 201 to the microphone array 100. Further, the microphone I/F 203 can be devised by executing software programs.

The input device 204 is, for example, a key board, a mouse, a press button, and a touch panel. A user can operate the acoustic signal processing apparatus 1 via the input device 204.

The display 205 is, for example, a liquid crystal display, a plasma display, a cathode-ray tube, and a lamp. The display 205 displays information of the target direction Dout and so on.

The communication device 206 is, for example, a modem, a hub, and a router. The acoustic signal processing apparatus 1 outputs the output signal to an external apparatus via the communication device 206.

The acoustic sound output device 207 is, for example, a speaker, and a buzzer that outputs sound. The acoustic sound output device 207 can be configured to output an output signal of the acoustic signal processing apparatus 1. Further, when the acoustic signal processing apparatus 1 is applied for a teleconference system (e.g., audio conference system), the acoustic sound output device 207 outputs the acoustic signal received from a communication partner.

The bus 208 connects the processor 201, the memory 202, the microphone I/F 203, the input device 204, the display 205, the communication device 206, and the acoustic sound output device 207 with each other.

(Operation of Acoustic Signal Processing Apparatus)

Figure 5:
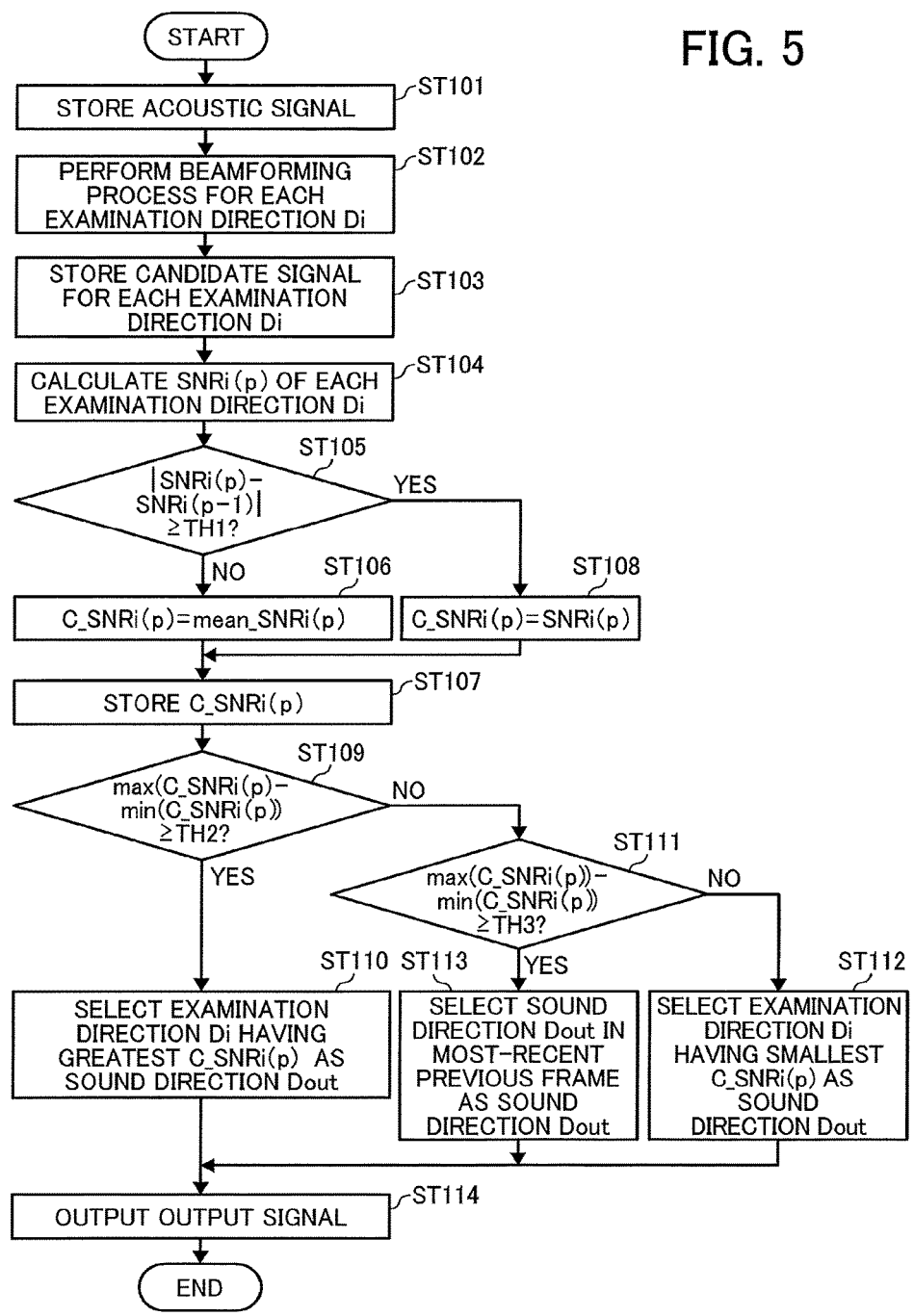
FIG. 5 is an example of a flow chart describing steps of an operation of the acoustic signal processing apparatus of the first embodiment.

FIG. 5 is an example of a flow chart describing steps of an operation of the acoustic signal processing apparatus 1 of the first embodiment. The acoustic signal processing apparatus 1 performs the operation of FIG. 5 periodically by setting a given time interval. Hereinafter, the acoustic signal processing apparatus 1 is operated for processing each one of frames, in which each frame has a given time length. In this description, a frame number of a current frame is indicated as "current frame (p)." Further, when the acoustic signal processing apparatus 1 is being operated, the sound collection unit 11 outputs the acoustic signal constantly.

When the processing of the current frame (p) is started, the acoustic signal storage 12 stores the acoustic signal output by the sound collection unit 11 for each of the channels (step ST101). In an example case of FIG. 5, the acoustic signal storage 12 is assumed to have a storage capacity to store the acoustic signal for one or more frames.

Then, the beam former 13 reads the acoustic signal of each of the channels from the acoustic signal storage 12, and performs the beamforming process for each of the examination directions Di based on the read acoustic signal of each of the channels, with which the effective signal Si and the noise signal Ni of each of the examination directions Di for the current frame (p) are generated (step ST102). The beam former 13 transfers the generated effective signal Si and the noise signal Ni of each of the examination directions Di to the feature calculator 15. The beamforming process can be performed as above described.

The beam former 13 further stores the generated effective signal Si in the candidate signal storage 14 as the candidate signal (step ST103). When the beam former 13 stores the generated effective signal Si, the candidate signal storage 14 stores the candidate signal (i.e., effective signal Si) for each of the examination directions Di.

Then, the feature calculator 15 calculates the feature Ci of each of the examination directions Di based on the effective signal Si and the noise signal Ni of each of the examination directions Di received from the beam former 13 (step ST104). Hereinafter, the feature Ci of the current frame (p) is referred to as the feature Ci(p).

A description is given of an example case when the feature C is a "signal to noise ratio (SNR)." The SNR is a ratio of a signal component with respect to a noise component. The SNR is determined by a sound level of sound coming from a sound source. Hereinafter, the feature Ci(p) of the current frame (p) is referred to as SNRi(p). The SNRi(p) is calculated by the following equation (1).

$$SNR_i(p) = \frac{\sum_{f=f\,min}^{f\,max} Si(f) \times Si(f)}{\sum_{f=f\,min}^{f\,max} Ni(f) \times Ni(f)} \quad (1)$$

In the equation (1), "f" denotes frequency, "Si(f)" denotes a signal level of a component having the frequency "f" included in the effective signal Si, "Ni(f)" denotes a signal level of a component having the frequency "f" included in the noise signal Ni, "fmin" denotes the lower limit frequency, and "fmax" denotes the upper limit frequency. The SNRi(p) calculated by the equation (1) is a SNR having a band range limitation set by the lower limit frequency "fmin" and the upper limit "frequency fmax."

The lower limit frequency "fmin" can be set to any frequency. The lower limit frequency "fmin" can be set to, for example, 20 Hz that is the lower limit frequency of the audible range of human ear. The higher the lower limit frequency "fmin", the smaller the calculation load of SNRi(p), with which the calculation of SNRi(p) can be performed faster.

The upper limit frequency "fmax" can be set to any frequency. The upper limit frequency "fmax" can be set to, for example, 20 kHz that is the upper limit frequency of the audible range of human ear. The lower the upper limit frequency "fmax", the smaller the calculation load of SNRi(p), with which the calculation of SNRi(p) can be performed faster.

The upper limit frequency "fmax" is preferably set with a value that does not cause the spatial aliasing to the effective signal Si and the noise signal Ni. The spatial aliasing means a folding noise of signal caused by a length of the installation interval "d" of the omnidirectional microphones.

Specifically, the upper limit frequency "fmax" is preferably set less than a lowest frequency "fnyq (i.e., first frequency)" that causes the spatial aliasing (fmax<fnyq). The spatial aliasing occurs when the frequency "f" becomes the lowest frequency "fnyq" or greater. The lowest frequency "fnyq" that causes the spatial aliasing can be calculated by the following equation (2).

$$f_{nyw} = c/(2 \times d) \quad (2)$$

In the equation (2), "d" denotes the installation interval of the omnidirectional microphones, and c" denotes the sound speed. The spatial aliasing occurs to a frequency component of the effective signal Si and the noise signal Ni having the frequency "f" that is equal to or greater than the lowest frequency "fnyq." By contrast, the spatial aliasing does not occur to a frequency component of the effective signal Si and the noise signal Ni having the frequency "f" less than the lowest frequency "fnyq."

Therefore, by setting the upper limit frequency "fmax" less than the lowest frequency fnyq, the SNRi(p) can be calculated by using the frequency component of the effective signal Si and the noise signal Ni that the spatial aliasing is not occurring, with which the SNRi(p) can be calculated with the enhanced precision.

Then, the feature calculator 15 stores the SNRi(p) calculated for each of the examination direction Di in the feature storage 16. When the feature calculator 15 stores the SNRi(p), the feature storage 16 stores the SNRi(p) for each of the examination directions Di. In an example case of FIG. 5, the feature storage 16 stores the SNRi (i.e., feature Ci) for "j" frames, wherein "j" is a natural number greater than one (j>1).

Then, the direction selector 17 reads the SNRi(p) of the current frame (p) and the SNRi(p−1) of the most-recent previous frame (p−1) for each of the examination directions Di from the feature storage 16, and the direction selector 17 determines whether a change rate of the SNRi(p) with respect to the SNRi(p−1) is equal to or greater than a pre-set first threshold $TH_1$ (step ST105), in which the direction selector 17 determines whether the following equation (3) is satisfied.

$$|SNR_i(p) - SNR_i(p-1)| \geq TH_1 \quad (3)$$

This determination corresponds to a process of detecting a change of sound condition for each of the examination directions Di. More specifically, this determination corresponds to a process of detecting emerging and diminishing of a sound source in each of the examination directions Di, which is described in detail as below.

When a sound source does not exist for one examination direction Di in the most-recent previous frame (p−1), the SNRi(p−1) of the most-recent previous frame (p−1) becomes a smaller value. Then, if the sound source emerges for the one examination direction Di in the current frame (p), the SNRi(p) of the current frame (p) becomes a value greater than the SNRi(p−1) of the most-recent previous frame (p−1), and thereby the SNRi(p) suddenly or sharply changes greatly from the SNRi(p−1). Specifically, the SNRi(p) of the current frame (p) increases greatly from the SNRi(p−1) of the most-recent previous frame (p−1).

By contrast, when a sound source exists for one examination direction Di in the most-recent previous frame (p−1), the SNRi(p−1) of the most-recent previous frame (p−1) becomes a greater value. Then, if the sound source diminishes for the one examination direction Di in the current frame (p), the SNRi(p) of the current frame (p) becomes a value smaller than the SNRi (p−1) of the most-recent previous frame (p−1), and thereby the SNRi(p) suddenly or sharply changes greatly from the SNRi(p−1). Specifically, the SNRi(p) of the current frame (p) decreases greatly from the SNRi(p−1) of the most-recent previous frame (p−1).

Further, when a sound source does not exist for one examination direction Di in the most-recent previous frame (p−1), the SNRi(p−1) of the most-recent previous frame (p−1) becomes a smaller value. Then, if the sound source also does not exist for the one examination direction Di in the current frame (p), the SNRi(p) of the current frame (p) becomes a value that is the same or similar to the SNRi(p−1) of the most-recent previous frame (p−1), and thereby the change rate of the SNRi(p) of the current frame (p) with respect to the SNRi(p−1) of the most-recent previous frame (p−1) becomes smaller.

Further, when a sound source exists for one examination direction Di in the most-recent previous frame (p−1), the SNRi(p−1) of the most-recent previous frame (p−1) becomes a greater value. Then, if the sound source also exists for the one examination direction Di in the current frame (p), the SNRi(p) of the current frame (p) becomes a value that is the same or similar to the SNRi(p−1) of the most-recent previous frame (p−1), and thereby the change rate of the SNRi(p) of the current frame (p) with respect to the SNRi(p−1) of the most-recent previous frame (p−1) becomes smaller.

Therefore, by setting the first threshold $TH_1$ with a suitable value, a sudden change of the SNRi(p) with respect to the SNRi(p−1) can be detected, which means one case that the sound source emerges for the examination direction Di can be detected effectively, and another case that the sound source diminishes for the examination direction Di can be detected effectively. The first threshold $TH_1$ can be set with the suitable value based on experiments.

Then, the direction selector 17 corrects the SNRi(p) based on a determination result at step ST105, which is the detection result related to the change of sound condition of the examination direction Di, and the corrected SNRi(p) is referred to as C_SNRi(p).

When the change rate of the SNRi(p) with respect to the SNRi(p−1) is less than the first threshold $TH_1$ (step ST105: NO), the direction selector 17 sets an average value of the SNRi of "j" frames as C_SNRi(p) (step ST106). The average value of the SNRi of "j" frames is referred to as "mean_SNRi(p)." The direction selector 17 reads the SNRi for "j" frames from the feature storage 16, and calculates the mean_SNRi(p) by using the following equation (4).

$$\text{mean\_SNR}_i(p) = \sum_{k=0}^{j-1} SNR_i(p-k)/j \quad (4)$$

The direction selector 17 stores the calculated mean_SNRi(p) in the feature storage 16 as the C_SNRi(p). When the direction selector 17 stores the calculated mean_SNRi(p), the feature storage 16 stores the mean_SNRi(p) as the C_SNRi(p) (step ST107). Then, the direction selector 17 selects or determines the target direction Dout based on the C_SNRi(p).

By selecting or determining the target direction Dout based on the averaged SNRi, an error selection of the target direction Dout caused by a momentary fluctuation of the SNRi can be reduced, in particular prevented. For example, when a speaking person hesitates and/or silence occurs, the SNRi(p) momentarily decreases, and the momentary decrease of SNRi(p) may cause the error selection of the target direction Dout. The above described configuration of the first embodiment can reduce, in particular prevent the error selection of the target direction Dout. The error selection means that a direction where a speaking person is present is not selected as the target direction Dout.

By contrast, when the change rate of the SNRi(p) with respect to the SNRi(p−1) is equal to or greater than the first threshold $TH_1$ (step ST105: YES), the direction selector 17 sets the SNRi(p) as the C_SNRi(p) (step ST108). Specifically, the direction selector 17 stores the SNRi(p) in the feature storage 16 as the C_SNRi(p). When the direction selector 17 stores the SNRi(p), the feature storage 16 stores the SNRi(p) as the C_SNRi(p) (step ST107).

The direction selector 17 sets the C_SNRi(p) for each one of the examination directions Di. Then, the direction selector 17 reads the C_SNRi(p) set for each of the examination directions Di from the feature storage 16, and determines whether a difference of the maximum value of C_SNRi(p) and the minimum value of C_SNRi(p) among the examination directions Di is equal to or greater than a pre-set second threshold $TH_2$ (step ST109). Specifically, the direction selector 17 determines whether the following equation (5) is satisfied.

$$\max(C\_SNR_i(p)) - \min(C\_SNR_i(p)) \geq TH_2 \quad (5)$$

In the equation (5), the max(C_SNRi(p)) is the maximum value of the C_SNRi(p) while the min(C_SNRi(p)) is the minimum value of the C_SNRi(p).

This determination corresponds to a process of determining whether a sound source exists. Specifically, when the sound source exists for one examination direction Di (first examination direction), a difference of the SNRi(p) of one examination direction Di (first examination direction) where a sound source exists and the SNRi(p) of another examination direction Di (second examination direction) where a sound source does not exist becomes greater. Therefore, by setting the second threshold $TH_2$ with a suitable value, the existence or non-existence of the sound source can be determined effectively. The second threshold TH 2 can be set with the suitable value based on experiments.

When the difference of the maximum value of the C_SNRi(p) and the minimum value of the C_SNRi(p) is equal to or greater than the second threshold $TH_2$ (step ST109: YES), the direction selector 17 determines that the sound source exists. Then, the direction selector 17 selects one examination direction Di having the greatest C_SNRi(p) as the target direction Dout (step ST110). The target direction Dout corresponds to the examination direction Di having the greatest acoustic signal level corresponding to the sound coming from the sound source among the examination directions Di where sound sources are determined to exist.

When the difference of the maximum value of the C_SNRi(p) and the minimum value of the C_SNRi(p) is less than the second threshold $TH_2$ (step ST109: NO), the direction selector 17 determines whether the difference of the maximum value of the C_SNRi(p) and the minimum value of the C_SNRi(p) is equal to or greater than a pre-set third threshold $TH_3$ (step ST111). The third threshold $TH_3$ is set smaller than the second threshold $TH_2$ ($TH_2 > TH_3$), in which the direction selector 17 determines whether the following equation (6) is satisfied.

$$\max(C\_SNR_i(p)) - \min(C\_SNR_i(p)) \geq TH_3 \quad (6)$$

This determination corresponds to a process for determining that the sound source does not exist because the difference of the maximum value of the C_SNRi(p) and the minimum value of the C_SNRi(p) among the examination directions Di becomes smaller when the sound source does not exist. Therefore, by setting the third threshold TH 3 with a suitable value, a case that the sound source does not exist can be determined effectively. The third threshold $TH_3$ can be set with the suitable value based on experiments.

When the difference of the maximum value of the C_SNRi(p) and the minimum value of the C_SNRi(p) is less than the third threshold $TH_3$ (step ST111: NO), the direction selector 17 determines that the sound source does not exist. Then, the direction selector 17 selects one examination direction Di having the smallest C_SNRi(p) as the target direction Dout (step ST112). The target direction Dout corresponds to the examination direction Di where the noise level of the noise component received by the microphones becomes the smallest level.

This can be assumed because when the sound source does not exist, the sound coming from each of the examination directions Di is assumed as a noise sound alone, and the level of C_SNRi(p) is assumed to correspond to the level of noise sound.

By contrast, when the difference of the maximum value of the C_SNRi(p) and the minimum value of the C_SNRi(p) is equal to or greater than the third threshold $T_3$ (step ST111: YES), the direction selector 17 determines that the existence and non-existence of the sound source is not confirmed. Then, the direction selector 17 selects one examination direction Di, selected as the target direction Dout of the most-recent previous frame (p−1), as the target direction Dout of the current frame (p) (step ST113).

When the direction selector 17 selects or determines the target direction Dout, the direction selector 17 reports the selected target direction Dout to the output unit 18. When the target direction Dout is reported from the direction selector 17, the output unit 18 reads the candidate signal (i.e., effective signal Sout) of the target direction Dout from the candidate signal storage 14, and outputs the read candidate signal as the output signal (step ST114).

Figure 6:
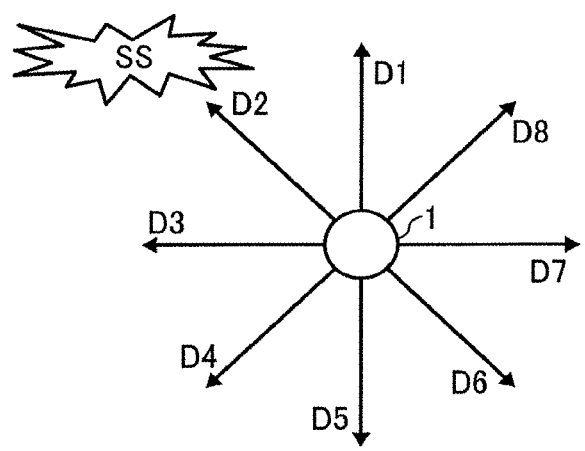
FIG. 6 is an example operation of the acoustic signal processing apparatus of the first embodiment.

A description is given of one example operation of the acoustic signal processing apparatus 1 with reference to FIG. 6. In an example case of FIG. 6, the examination direction includes eight examination directions Di (i=1 to 8) by setting the same interval for the eight examination directions (i.e., examination directions D1 to D8). A description is given of an example case that the sound source SS emerges at the examination direction D2 in the current frame (p), in which it is assumed that the sound source SS does not exist in the most-recent previous frame (p−1).

When the processing of the current frame (p) is started, the acoustic signal storage 12 stores the acoustic signal output from the sound collection unit 11 for each of the channels (step ST101). The acoustic signal of each of the channels includes an acoustic signal corresponding to a sound coming from the sound source SS that exists at the examination direction D2.

Then, the beam former 13 performs the beamforming process based on the acoustic signal stored in the acoustic signal storage 12, and generates the effective signal Si and the noise signal Ni for each of the examination directions Di (step ST102). With this configuration, the effective signals S1 to S8 and the noise signals N1 to N8 are generated for each of the examination directions D1 to D8. Since the sound source SS exists at the examination direction D2, the effective signal S2 becomes a relatively greater value. The effective signals S1 to S8 are stored in the candidate signal storage 14 (step ST103).

Then, the feature calculator 15 calculates SNR1($p$) of the examination direction D1 based on the effective signal S1 and the noise signal N1 (step ST104), and also calculates SNR2($p$) to SNR8($p$) of the examination directions D2 to D8 similarly. Since the effective signal S2 becomes the relatively greater value, the SNR2($p$) becomes a relatively greater value. Then, the calculated SNRi(p) that are the SNR1($p$) to SNR8($p$) are stored in the feature storage 16.

The direction selector 17 reads the SNRi(p) from the feature storage 16 to determine whether the change rate of the SNRi(p) with respect to the SNRi(p−1) is equal to or greater than the first threshold $TH_1$ for each of the examination directions Di (step ST105).

Since the sound source SS does not exist at the examination directions D1, and D3 to D8 in the most-recent previous frame (p−1) and the current frame (p), the change rate of the SNRi(p) with respect to the SNRi(p−1) becomes smaller for the examination directions D1, and D3 to D8, and becomes less than the first threshold $TH_1$ (step ST105: NO). Therefore, the direction selector 17 sets mean_SNRi(p) of the examination directions D1, and D3 to D8 as C_SNRi(p) of the examination directions D1, and D3 to D8 (step ST106).

By contrast, since the sound source SS emerges in the current frame (p) at the examination direction D2, the SNRi(p) suddenly increases greatly from the SNRi(p−1), and thereby the change rate of the SNRi(p) with respect to the SNRi(p−1) becomes equal to or greater than the first threshold $TH_1$ (step ST105: YES). Therefore, the direction selector 17 sets the SNR2($p$) of the examination direction D2 as C_SNR2($p$) of the examination direction D2 (step ST108).

Then, the C_SNRi(p) set for each of the examination directions Di (i.e., D1 to D8) by the above described sequence are stored in the feature storage 16 (step ST107).

Then, the direction selector 17 determines whether the difference of the maximum value of the C_SNRi(p) and the minimum value of the C_SNRi(p) is equal to or greater than the second threshold $TH_2$ (step ST109). In this example case, the maximum value of C_SNRi(p) is the C_SNR2($p$) while the minimum value of C_SNRi(p) is any one of the C_SNR1($p$) and C_SNR3($p$) to C_SNR8($p$). For example, it is assumed that the C_SNR1($p$) is the minimum value C_SNRi(p).

Since the difference of the C_SNR2($p$) (=SNR2($p$)) and the C_SNR1($p$) is equal to or greater than the second threshold $TH_2$ (step ST109: YES), the direction selector 17 selects the examination direction D2 as the target direction Dout (step ST110).

When the examination direction D2 is reported as the target direction Dout from the direction selector 17 to the output unit 18, the output unit 18 reads the effective signal S2 of the examination direction D2 from the candidate signal storage 14, and outputs the read effective signal S2 as the output signal (step ST114).

As to the above described acoustic signal processing apparatus 1 of the first embodiment, when the sound source does not exist, the acoustic signal processing apparatus 1 selects one examination direction Di having the smallest noise level as the target direction Dout, and outputs an output signal corresponding to the sound coming from the target direction Dout having the smallest noise level. With this configuration, the sound coming from the examination direction Di having the smallest noise level is transmitted to a communication partner, and thereby the transmission of noise sound to the communication partner can be reduced, in particular prevented.

Further, as to the acoustic signal processing apparatus 1 of the first embodiment, when the sound source exists, the acoustic signal processing apparatus 1 selects the one examination direction Di where the sound source exists as the target direction Dout, and outputs an output signal corresponding to the sound coming from the target direction Dout where the sound source exists. With this configuration, the sound coming from the examination direction Di where the sound source exists, which means the sound coming from the sound source, is transmitted to a communication partner, and thereby the sound coming from the sound source can be collected with the enhanced precision, and transmitted to the communication partner with the enhanced precision.

When the acoustic signal processing apparatus 1 is applied to a teleconference system (e.g., audio conference system), and a speaking person (i.e., sound source) does not exist, the acoustic signal processing apparatus 1 transmits the sound coming from one examination direction Di having the smallest noise level to a communication partner. Further, when a speaking person (i.e., sound source) exists, the acoustic signal processing apparatus 1 transmits voice spoken by the speaking person (i.e., sound source) to the communication partner. Therefore, the acoustic signal processing apparatus 1 can collect the voice spoken by the speaking person with the enhanced precision while the transmission of noise sound to the communication partner can be reduced, in particular prevented. Therefore, the acoustic signal processing apparatus 1 of the first embodiment can devise a conference system that is comfortable for communication partners.

Further, the acoustic signal processing apparatus 1 of the first embodiment collects sounds by using the sound receivers such as the omnidirectional microphones. Therefore, when the acoustic signal processing apparatus 1 is applied to a teleconference system (e.g., audio conference system), the teleconference system can be configured with lesser cost compared to conventional teleconference system that collects sounds by using directive microphones.

Further, as to the acoustic signal processing apparatus 1 of the first embodiment, the acoustic signal processing apparatus 1 determines whether the sound source exists in the examination direction Di based on the change rate of the feature Ci of the current frame with respect to the feature Ci of the most-recent previous frame. Therefore, the acoustic signal processing apparatus 1 can collect sound when the sound source emerges without missing the collection of sound. This can be achieved because the acoustic signal suddenly increases, and the feature Ci changes greatly when the sound source emerges.

Further, as to the acoustic signal processing apparatus 1 of the first embodiment, the acoustic signal processing apparatus 1 corrects the feature Ci of the current frame based on the feature Ci of the previous frames in a previous time period such as a previous time period corresponding to "j" frames. Then, the acoustic signal processing apparatus 1 determines whether the sound source exists based on the corrected feature Ci. Therefore, the error selection of the target direction Dout causable by the momentary fluctuation of the acoustic signal (i.e., feature Ci) can be suppressed, in particular prevented. Further, in the above first embodiment, steps ST111 and ST113 can be omitted.

With this configuration, the calculation load of the selection process of the target direction Dout can be reduced, with which the selection process can be performed faster. When steps ST111 and ST113 are omitted, step ST109 can be used to determine whether the direction of the sound source changes, and if step ST109 is NO, step ST112 is performed.

Second Embodiment

Figure 7:
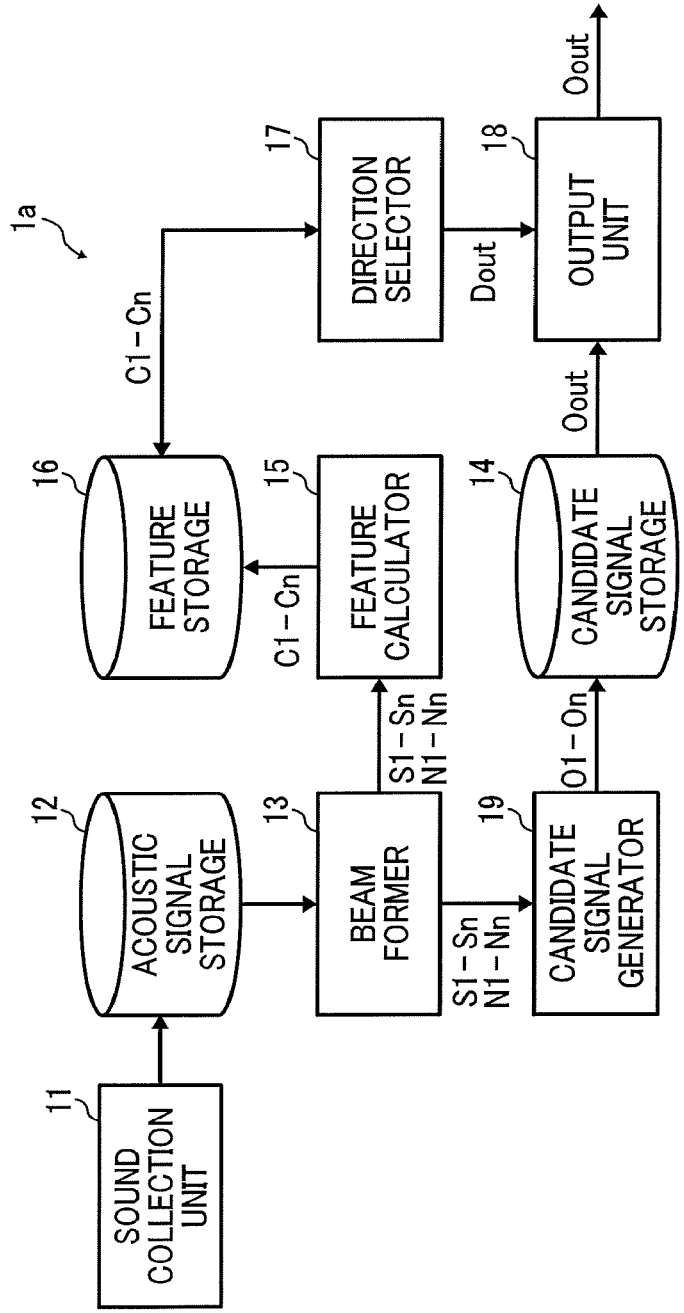
FIG. 7 is an example of a functional block diagram of an acoustic signal processing apparatus of a second embodiment.
Figure 8:
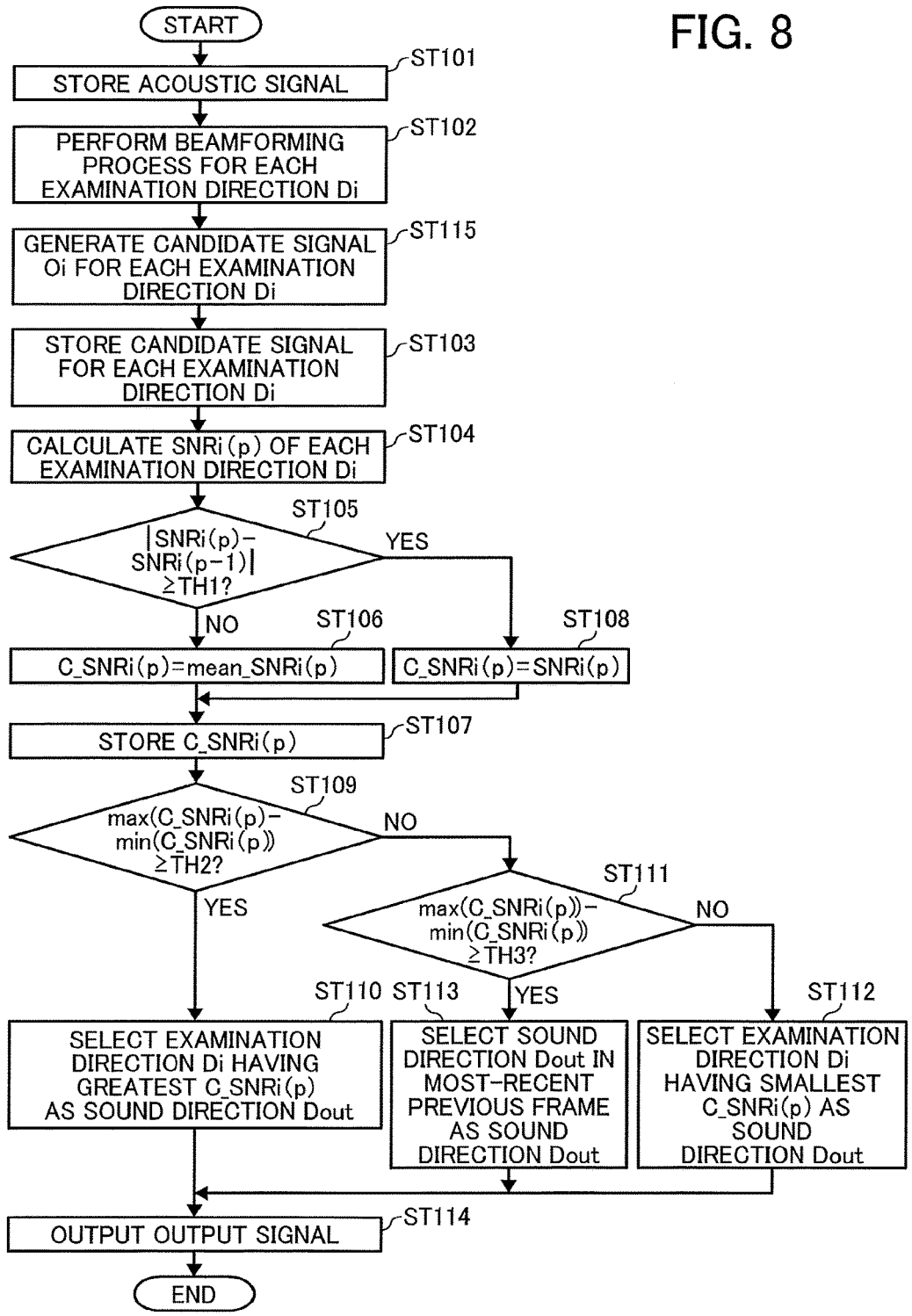
FIG. 8 is an example of a flow chart describing steps of an operation of a process of the acoustic signal processing apparatus of the second embodiment.

A description is given of an acoustic signal processing apparatus 1a of a second embodiment with reference to FIGS. 7 and 8. A description is given of the acoustic signal processing apparatus 1a having higher direction detection capability (higher directivity) that can detect the sound source with the enhanced precision.

(Configuration of Acoustic Signal Processing Apparatus)

FIG. 7 is an example of a functional block diagram of the acoustic signal processing apparatus 1a of the second embodiment. As indicted in FIG. 7, the acoustic signal processing apparatus 1a further includes a candidate signal generator 19. Other functional configuration and hardware configuration of the second embodiment are same as the first embodiment.

The candidate signal generator 19 generates a candidate signal Oi for each of the examination directions Di based on the effective signal Si and the noise signal Ni of each of the examination directions Di generated by the beam former 13, and stores the candidate signal Oi generated for each of the examination directions Di in the candidate signal storage 14. In the second embodiment, the candidate signal storage 14 stores the candidate signal Oi of each of the examination directions Di generated by the candidate signal generator 19.

As to the second embodiment, the candidate signal generator 19 removes the noise signal Ni (i.e., noise component) from the effective signal Si to generate the candidate signal Oi for each of the examination directions Di. With this configuration, the candidate signal Oi, having improved the SNRi from the effective signal Si, is generated for each of the examination directions Di.

The noise signal Ni can be removed from the effective signal Si by a known method such as Minimum Mean-Square-Error Short-Time Spectral Amplitude estimator (MMSE-STSA) method, but not limited thereto. Further, the candidate signal generator 19 can be devised by executing one or more programs stored in the memory 202 by the processor 201.

Operation of Acoustic Signal Processing Apparatus of Second Embodiment

FIG. 8 is an example of a flow chart describing steps of an operation of the acoustic signal processing apparatus 1a of the second embodiment. Different from the flow chart of FIG. 5 of the first embodiment, the flow chart of FIG. 8 includes step ST115 while other steps are same as the first embodiment.

In the second embodiment, at step ST102, the beam former 13 generates the effective signal Si and the noise signal Ni for each of the examination directions Di, and transfers the effective signal Si and the noise signal Ni generated for each of the examination directions Di to the feature calculator 15 and the candidate signal generator 19.

After receiving the effective signal Si and the noise signal Ni of each of the examination directions Di, the candidate signal generator 19 removes the noise signal Ni from the effective signal Si for each of the examination directions Di to generate the candidate signal Oi for each of the examination directions Di (step ST115). The candidate signal Oi can be generated by performing the above described method. Then, the candidate signal generator 19 stores the candidate signal Oi generated for each of the examination directions Di in the candidate signal storage 14. When the candidate signal generator 19 stores the generated candidate signal Oi, the candidate signal storage 14 stores the candidate signal Oi for each of the examination directions Di (step ST103).

The sequence after step ST115 of the second embodiment is similar to the first embodiment. However, in the second embodiment, at step ST114, the output unit 18 outputs the candidate signal Oout generated for the target direction Dout as the output signal.

As above described, the acoustic signal processing apparatus 1a of the second embodiment can output the candidate signal Oi, having improved the SNRi from the effective signal Si, as the output signal. Therefore, as to the second embodiment, the direction detection capability of the acoustic signal processing apparatus 1a can be further enhanced.

Third Embodiment

Figure 9:
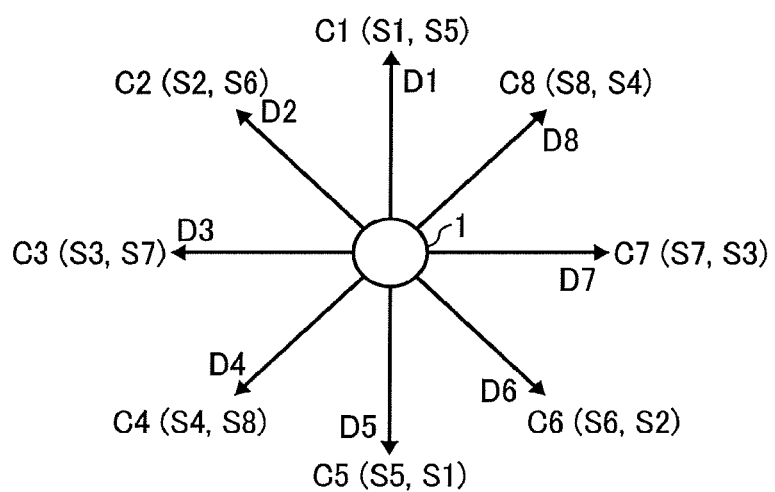
FIG. 9 illustrates an example of a calculation method of feature in a third embodiment.

A description is given of the acoustic signal processing apparatus 1 used as a third embodiment with reference to FIG. 9. A description is given of the acoustic signal processing apparatus 1 that can calculate the feature Ci without using the noise signal Ni as the third embodiment.

The functional block diagram of the acoustic signal processing apparatus 1 of the third embodiment is same as the first embodiment except the processing at the beam former 13 and the feature calculator 15. Further, the acoustic signal processing apparatus 1 of the third embodiment has a hardware configuration same as the first embodiment. A description is given of the beam former 13 and the feature calculator 15 of the third embodiment.

In the third embodiment, the beam former 13 generates the effective signal Si for each of the examination directions Di based on the acoustic signals. However, the beam former 13 does not generate the noise signal Ni.

Specifically, the feature calculator 15 calculates the feature Ci of one examination direction Di (i.e., first examination direction) based on the effective signal Si of one examination direction Di (i.e., first examination direction) and the effective signal Sj of another examination direction Dj (i.e., second examination direction). In the third embodiment, the effective signal Sj of another examination direction Dj (i.e., second examination direction) is used as a noise component for the effective signal Si of one examination direction Di (i.e., first examination direction), whereas the actual noise signal Ni is used as the noise component in the first embodiment, because the effective signal Sj is an acoustic signal corresponding to a sound coming from another examination direction Dj (i.e., second examination direction), which is different from the one examination direction Di (i.e., first examination direction).

The another examination direction Dj (i.e., second examination direction) can be selected from any one of "n−1" examination directions D excluding the one examination direction Di (i.e., first examination direction). Since the effective signal Sj is used as the noise component for the effective signal Si, an acoustic signal corresponding to the sound coming from near the examination direction Di is not preferably used as the effective signal Sj. Therefore, the examination direction Dj is preferably an opposite direction of the examination direction Di such as the examination direction Dj is opposite to the examination direction Di for 180 degrees, and near the opposite direction of the examination direction Di. By using the above mentioned effective signal Sj as the noise component for the effective signal Si, the feature calculator 15 can calculate the feature Ci with the enhanced precision.

Further the calculation method of the feature Ci of the third embodiment is similar to the first embodiment except that the effective signal Sj is used in the third embodiment instead of the noise signal Ni of the first embodiment. For example, the SNRi(p) of the examination direction Di can be calculated by the following equation (7) in the third embodiment.

$$SNR_i(p) = \frac{\sum_{f=f\,min}^{f\,max} Si(f) \times Si(f)}{\sum_{f=f\,min}^{f\,max} Sj(f) \times Sj(f)} \quad (7)$$

FIG. 9 illustrates an example of the calculation method of the feature Ci of the third embodiment. In an example case of FIG. 9, the examination direction includes eight examination directions Di (i=1 to 8) by setting the same interval for the eight examination directions (i.e., examination directions D1 to D8). For example, a feature C2 of the examination direction D2 is calculated from the effective signal S2 and the effective signal S6, in which the effective signal S6 is used as a noise component for the effective signal S2. Further, a feature C6 of the examination direction D6 is calculated from the effective signal S6 and the effective signal S2, in which the effective signal S2 is used as a noise component for the effective signal S6.

As above described, the acoustic signal processing apparatus 1 of the third embodiment can calculate the feature Ci without using the noise signal Ni. Therefore, even if the beam former 13 cannot calculate the noise signal Ni (i.e., when an output value of subtractor of the delay and sum beam former is not acquired), the feature Ci can be calculated.

Further, in the third embodiment, one effective signal Si can be used as the effective signal Sj used as the noise component. For example, in an example case of FIG. 9, the effective signal S5 can be used as a noise component for the effective signal S1 to calculate the feature C1 (see C1 (S1, S5) in FIG. 9), the effective signal S6 can be used as a noise component for the effective signal S2 to calculate the feature C2 (see C2 (S2, S6) in FIG. 9), the effective signal S7 can be used as a noise component for the effective signal S3 to calculate the feature C3 (see C3 (S3, S7) in FIG. 9), and the effective signal S8 can be used as a noise component for the effective signal S4 to calculate the feature C4 (see C4 (S4, S8) in FIG. 9). In this case, features C1 to C4 are calculated while feature C5 to C8 are not calculated. Therefore, the target direction Dout is selected from one of the examination directions D1 to D4.

Further, one effective signal Sj can be used as the noise component for a plurality of the effective signals Si. For example, in an example case of FIG. 9, the effective signal S8 can be used as the noise component for the effective signals S1 to S7, in which the features C1 to C7 are calculated by using the effective signal S8 as the noise component for the effective signals S1 to S7.

Further, the feature Ci can be calculated by using the noise component calculated from the plurality of the effective signals Sj. For example, in an example case of FIG. 9, the feature C1 of the effective signal S1 can be calculated using a signal, which is acquired by averaging the effective signals S4 to S6, as the noise component for the effective signal S1.

Fourth Embodiment

Figure 10:
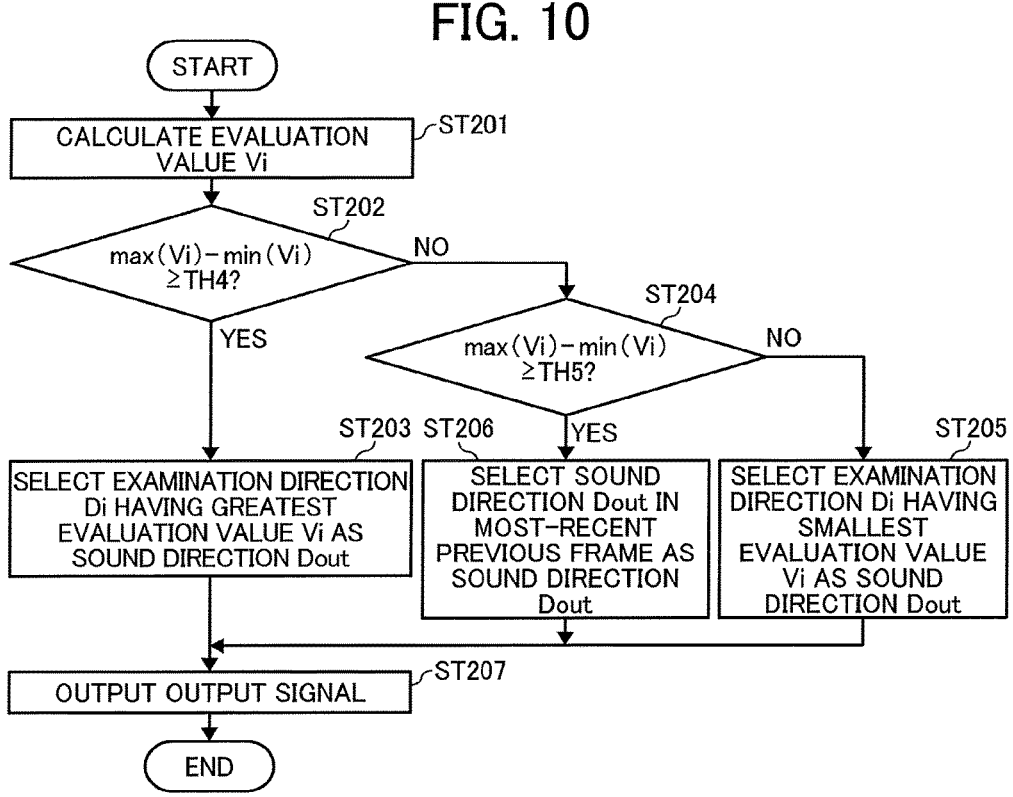
FIG. 10 is an example of a flow chart describing steps of a process of a first selection method of a fourth embodiment.
Figure 11:
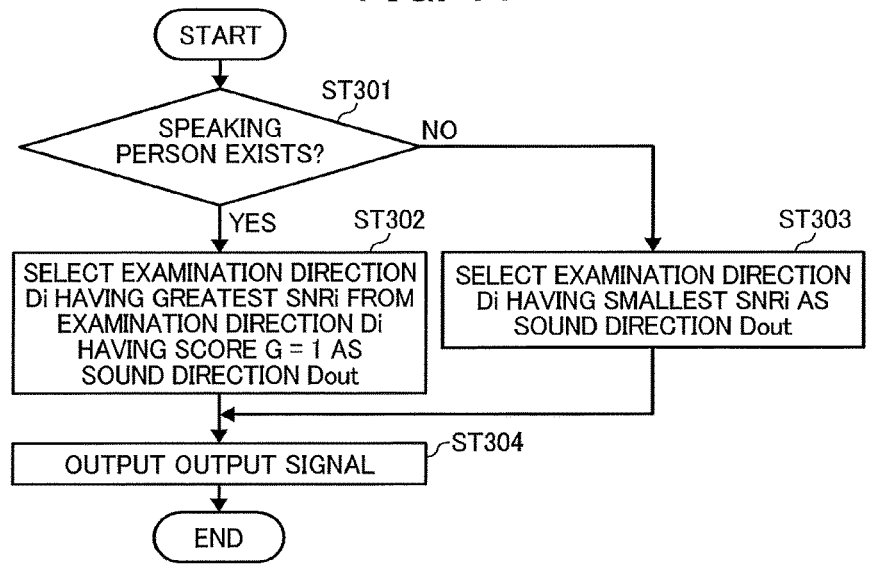
FIG. 11 is an example of a flow chart describing steps of a process of a second selection method of the fourth embodiment.
Figure 12:
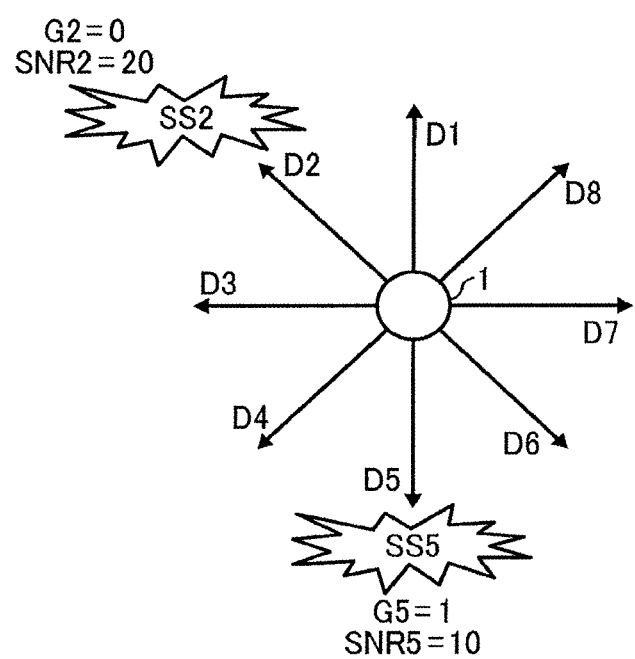
FIG. 12 is one example applying the second selection method of the fourth embodiment.

A description is given of the acoustic signal processing apparatus 1 used as a fourth embodiment with reference to FIGS. 10 to 12. A description is given of the acoustic signal processing apparatus 1 that can detect a specific sound type (i.e., target sound type) by using a plurality of features C as the fourth embodiment.

The functional block diagram of the acoustic signal processing apparatus 1 of the fourth embodiment is same as the functional block diagram of the first embodiment except the processing at the feature calculator 15 and the direction selector 17. Further, the acoustic signal processing apparatus 1 of the fourth embodiment has a hardware configuration same as the first embodiment. A description is given of the feature calculator 15 and the direction selector 17 of the fourth embodiment.

Specifically the feature calculator 5 calculates the plurality of the features Ci for each of the examination directions Di, and stores the plurality of the features Ci in the feature storage 16. Hereinafter, it is assumed that "Q" features (i.e., first to Q-th features) are calculated as the plurality of the features Ci. The q-th feature Ci of each of the examination directions Di is set as the feature Ciq. The plurality of the features Ciq is collectively referred to as the feature Ci. In this configuration, the following equation (8) expresses the feature Ci as a vector having "Q" features Ciq.

$$Ci = [C_{i1} \ C_{i2} \ldots C_{iQ}] \quad (8)$$

In the fourth embodiment, the feature Ciq is not limited to the acoustic feature such as SNR. For example, the feature Ciq can be higher-order statistics (HOS) and a score of a classifier. The higher-order statistics (HOS) is, for example, kurtosis, and cumulant. The classifier is, for example, Hidden Markov Model (HMM), Gaussian Mixture Model (GMM), and Deep Neural Network (DNN). The feature Ciq preferably has a higher correlation with a feature of a specific sound type such as a target sound type (e.g., human voice).

The direction selector 17 selects or determines the target direction Dout based on the feature Ci of each of the examination directions Di. A description is given of a first selection method and a second selection method of the target direction Dout.

(First Selection Method)

A description is given of a first selection method of the target direction Dout using the feature Ci. The first selection method calculates an evaluation value Vi for each of the examination directions Di based on the feature Ci, and selects or determines the target direction Dout based on the evaluation value Vi.

The evaluation value Vi is, for example, a linear sum of "Q" features Ciq, but not limited thereto. When the evaluation value Vi is the linear sum of "Q" features Ciq, the evaluation value Vi can be expressed by the following equations (9) and (10), in which the feature Ciq has a weight coefficient "wq."

$$Vi = w_1 \times C_{i1} + w_2 \times C_{i2} + \ldots + w_s \times C_{iQ} \qquad (9)$$

$$\text{where} \sum_{k=1}^{Q} w_k = 1 \qquad (10)$$

The evaluation value Vi is preferably calculated such that the evaluation value Vi becomes greater (or smaller) as probability of existence of the sound source outputting a detection-target sound (i.e., target sound type) becomes higher. For example, when human voice is to be detected as the sound source, the evaluation value Vi is calculated to become greater (or smaller) as probability of existence of a speaking person becomes higher. For example, the evaluation value Vi can be calculated by using a score of a classifier that classifies the existence and non-existence of the speaking person (i.e., acoustic signal corresponding to human voice) as the feature Ciq. The weight coefficient "w" of the equation (9) can be set with a suitable value based on experiments.

FIG. 10 is an example of a flow chart describing steps of a process of the first selection method. The sequence of FIG. 10 is performed instead of step ST104 and the subsequent steps (FIG. 5) of the first embodiment. Therefore, when the sequence of FIG. 10 is started, the feature storage 16 already stores the feature Ci of each of the examination directions Di. A description is given of an example case that the acoustic signal processing apparatus 1 detects human voice as the sound source.

At first, the direction selector 17 reads the feature Ci of each of the examination directions Di from the feature storage 16, calculates the evaluation value Vi for each of the examination directions Di based on the feature Ci read for each of the examination directions Di (step ST201). In this example case, it is assumed that the evaluation value Vi becomes greater as a probability of existence of a speaking person becomes higher.

Then, the direction selector 17 determines whether a difference of the maximum value (max(Vi)) and the minimum value (min(Vi)) of the evaluation value Vi is equal to or greater than a pre-set fourth threshold $TH_4$ (step ST202).

This determination corresponds to a process of determining whether a speaking person (i.e., sound source) exists because when the speaking person exists, a difference of the evaluation value Vi of one examination direction Di where the speaking person exists and the evaluation value Vi of another examination direction Di where the speaking person does not exist becomes greater. Therefore, by setting the fourth threshold $TH_4$ with a suitable value, it can determine that the speaking person exists at the one examination direction Di. The fourth threshold $TH_4$ can be set with the suitable value based on experiments.

When the difference of the maximum value and the minimum value of the evaluation value Vi is equal to or greater than the fourth threshold $TH_4$ (step ST202: YES), the direction selector 17 determines that the speaking person exists. Then, the direction selector 17 selects one examination direction Di having the greatest evaluation value Vi as the target direction Dout (step ST203), in which the target direction Dout corresponds to a direction where the existence of the speaking person is determined.

By contrast, when the difference of the maximum value (max(Vi)) and the minimum value (min(Vi)) of the evaluation value Vi is less than the fourth threshold $TH_4$ (step ST202: NO), the direction selector 17 determines whether the difference of the maximum value (max(Vi)) and the minimum value (min(Vi)) of the evaluation value Vi is equal to or greater than a pre-set fifth threshold $TH_5$ (step ST204). The fifth threshold $TH_5$ is set smaller than the fourth threshold $TH_4$ ($TH_4 > TH_5$).

This determination corresponds to a process for determining that the speaking person does not exist because when the speaking person does not exist, the difference of the maximum value (max(Vi)) and the minimum value (min(Vi)) of the evaluation value Vi of the examination directions Di becomes smaller. Therefore, by setting the fifth threshold $TH_5$ with a suitable value, non-existence of the speaking person can be determined. The fifth threshold $TH_5$ can be set with the suitable value based on experiments.

When the difference of the maximum value (max(Vi)) and the minimum value (min(Vi)) of the evaluation value Vi is less than the fifth threshold $TH_5$ (step ST204: NO), the direction selector 17 determines that the speaking person does not exist. Then, the direction selector 17 selects one examination direction Di having the smallest evaluation value Vi as the target direction Dout (step ST205), in which the target direction Dout corresponds to the examination direction Di where the noise level of the noise sound received by the microphone becomes the smallest level.

This can be assumed because when the speaking person does not exist, any sound coming from each of the examination directions Di becomes the noise sound, and the level of the evaluation value Vi is assumed to correspond to a sensitivity level of the noise sound.

By contrast, when the difference of the maximum value (max(Vi)) and the minimum value (min(Vi)) of the evaluation value Vi is equal to or greater than the fifth threshold $TH_5$ (step ST204: YES), the direction selector 17 determines that the existence and non-existence of the speaking person is not confirmed. Then, the direction selector 17 selects one examination direction Di, which is selected as the sound output direction Di of the most-recent previous frame (p−1), as the target direction Dout of the current frame (p) (step ST206).

When the direction selector 17 selects or determines the target direction Dout, the direction selector 17 reports the selected target direction Dout to the output unit 18. When the target direction Dout is reported from the direction selector 17, the output unit 18 reads the candidate signal of the target direction Dout from the candidate signal storage 14, and outputs the read candidate signal as the output signal (step ST207).

Further, as to the first selection method, step ST204 and ST206 can be omitted. With this configuration, the calculation load of the selection process of the target direction Dout can be reduced, with which the selection process can be performed faster. When steps ST204 and ST206 are omitted, step ST202 can be used to determine whether the direction where the speaking person exists is changed. Specifically, if step ST202 is NO, step ST205 is performed.

Further, in an example case of FIG. 10, the direction selector 17 determines the existence and non-existence of the speaking person based on a relative evaluation of the evaluation value Vi, but not limited thereto. For example, the direction selector 17 can determine the existence and non-existence of the speaking person based on an absolute evaluation of the evaluation value Vi, in which when at least one of the evaluation values Vi is equal to or greater than a sixth threshold $TH_6$, the direction selector 17 determines that the speaking person exists, and selects one examination direction Di having the greatest evaluation value Vi as the target direction Dout. Further, when all of the evaluation values Vi are less than a seventh threshold TH 7, the direction selector 17 determines that the speaking person does not exist, and selects one examination direction Di having the smallest evaluation value Vi as the target direction Dout. The sixth threshold $TH_6$ and the seventh threshold $TH_7$ can be set with suitable values based on experiments. Further, the sixth threshold $TH_6$ and the seventh threshold $TH_7$ can be the same or different.

(Second Selection Method)

A description is given of the second selection method of the target direction Dout using the feature Ci. The second selection method uses one feature Ciq for determining the existence and non-existence of a detection-target sound source, and another feature Ciq for selecting the target direction Dout, in which different features are used.

FIG. 11 is an example of a flow chart describing steps of a process of the second selection method. The sequence of FIG. 11 is performed instead of step ST104 and the subsequent steps (FIG. 5) in the first embodiment. Therefore, when the sequence of FIG. 11 is started, the feature storage 16 already stores the feature Ci of each of the examination directions Di. A description is given of an example case that the acoustic signal processing apparatus 1 detects human voice as a sound source.

Further, it is assumed that the feature Ci of each of the examination directions Di includes a first feature Ci1 and a second feature Ci2. For example, it is assumed that the first feature Ci1 corresponds to the SNRT, and the feature Ci2 corresponds to a score Gi. In this example case, the score G is a determination result indicating whether a speaking person exists in the examination direction Di (i.e., the score G indicates whether human voice is included in the sound coming from the examination direction Di). In this example case, it is assumed that when the score Gi has a value of 1, the score Gi indicates that the speaking person exists in the examination direction Di, and when the score Gi has a value of 0, the score Gi indicates that the speaking person does not exist in the examination direction Di. The score G can be obtained by inputting the effective signal Si to a known processing method such as Gaussian Mixture Model (GMM) or the like.

At first, the direction selector 17 reads the feature Ci of each of the examination directions Di from the feature storage 16, and determines whether a speaking person exists based on the score Gi (i.e., second feature Ci2) read for each of the examination directions Di (step ST301). When the score G having the value of "1" exists at least one examination direction Di, the direction selector 17 determines that the speaking person exist. By contrast, when the score G having the value of "1" does not exist at any one of the examination directions Di, the direction selector 17 determines that the speaking person does not exist.

When the speaking person exists (step ST301: YES), the direction selector 17 selects one examination direction Di having the greatest SNRi from the examination directions Di having the score Gi of "1" as the target direction Dout (step ST302).

By contrast, when the speaking person does not exist (step ST301: NO), the direction selector 17 selects one examination direction Di having the smallest SNRi as the target direction Dout (step ST303).

When the direction selector 17 selects or determines the target direction Dout, the direction selector 17 reports the selected target direction Dout to the output unit 18. When the target direction Dout is reported from the direction selector 17, the output unit 18 reads the candidate signal of the target direction Dout from the candidate signal storage 14, and outputs the read candidate signal as the output signal (step ST304).

A description is given of one example case applying the second selection method with reference to FIG. 12. In an example case of FIG. 12, the examination direction includes eight examination directions Di (i=1 to 8) by setting the same interval for the eight examination directions (i.e., examination directions D1 to D8). In this example case, it is assumed that a sound source SS2 (e.g. speaker device), which is not a speaking person, exists at the examination direction D2. Due to the sound coming from the sound source SS2 (e.g. speaker device), the score G2 (i.e., feature C22) becomes "0" for the examination direction D2, and SNR2 (i.e., feature C21) becomes "20" for the examination direction D2.

Further, in this example case, it is assumed that a sound source SS5 exists at the examination direction D5, and the sound source SS5 is a speaking person. Due to the sound (i.e., human voice) coming from the sound source SS5 (i.e., speaking person), the score G5 (i.e., feature C52) becomes "1" for the examination direction D5, and SNR5 (i.e., feature C51) becomes "10" for the examination direction D5. For the simplicity of description, it is assumed that the score Gi and SNRi of other examination directions Di are all set zero (0).

In this example case, since the score G5 is 1, the direction selector 17 determines that the speaking person exists (step ST301: YES). Then, the direction selector 17 selects the examination direction D5, which is the examination direction Di having the greatest SNRi, as the target direction Dout among the examination directions Di having the score G of 1 (step ST302). Then, the output unit 18 outputs the candidate signal of the examination direction D5 as the output signal (step ST304). Specifically, the acoustic signal processing apparatus 1 outputs a signal corresponding to the sound (i.e., human voice) coming from the sound source SS5 (i.e., speaking person).

As above described, the acoustic signal processing apparatus 1 of the fourth embodiment can detect a specific sound type (e.g., sound source), and can select or determine the target direction Dout from the examination directions Di that are respectively detected having a sound source by using the plurality of features Ciq. In this configuration, even if a noise sound (e.g., sound type different from a specific sound type) is received by the microphones, the examination direction Di where the sound source outputting the specific sound type can be selected as the target direction Dout.

For example, in an example case of FIG. 12, the SNR2 of the noise sound coming from the sound source SS2 is greater than the SNR5 of the human voice coming from the sound source SS5. However, as above described, the acoustic signal processing apparatus 1 can select the examination direction D5 as the target direction Dout, and output the output signal corresponding to the human voice coming from the sound source SS5.

When the acoustic signal processing apparatus 1 of the fourth embodiment is applied to a teleconference system (e.g., audio conference system), the acoustic signal processing apparatus 1 can reduce, in particular prevent, an effect of noise sound, and collect human voice coming from the speaking person with the enhanced precision, and transmit an acoustic signal to a communication partner with the enhanced precision.

As to the above described embodiments of the acoustic signal processing apparatus, the transmission of noise sound can be reduced, in particular prevented.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions. Further, the above described image processing method performable in the image processing apparatus can be described as a computer-executable program, and the computer-executable program can be stored in a ROM or the like in the image processing apparatus and executed by the image processing apparatus. Further, the computer-executable program can be stored in a storage medium or a carrier such as compact disc-read only memory (CD-ROM), digital versatile disc-read only memory (DVD-ROM) or the like for distribution, or can be stored on a storage on a network and downloaded as required.

Numerous additional modifications and variations for the communication terminal, information processing system, and information processing method, a program to execute the information processing method by a computer, and a storage or carrier medium of the program are possible in light of the above teachings. It is therefore to be understood that within the scope of the appended claims, the description of present disclosure may be practiced otherwise than as specifically described herein. For example, elements and/or features of different examples and illustrative embodiments may be combined each other and/or substituted for each other within the scope of present disclosure and appended claims.

What is claimed is:

1. An acoustic signal processing apparatus comprising; circuitry to:
generate, when a plurality of sound receivers receive sound from a plurality of examination directions in a space and outputs acoustic signals of a plurality of channels to the circuitry, an effective signal corresponding to sound coming from each one of the examination directions based on the acoustic signals of the plurality of channels for each one of the examination directions;
calculate a feature for each one of the examination directions based on the effective signal generated for each one of the examination directions; and
select a target direction from the plurality of examination directions in the space based on the feature calculated for each one of the examination directions,
wherein the plurality of examination directions includes a first examination direction, and at least one other examination direction including a second examination direction different from the first examination direction, and
wherein when the circuitry generates the effective signal for the first examination direction, the circuitry generates a noise signal for the first examination direction based on acoustic signals corresponding to sound coming from the second examination direction, and then the circuitry calculates the feature for the first examination direction based on the effective signal and the noise signal generated for the first examination direction.

2. The acoustic signal processing apparatus of claim 1, wherein the circuitry determines whether a sound source exists for each one of the examination directions based on the feature calculated for each one of the examination directions,
wherein when the circuitry determines that the sound source exists for one or more of the examination directions, the circuitry selects one of the examination directions where a signal level of sound coming from the sound source becomes the greatest level from the one or more of the examination directions,
wherein when the circuitry determines that the sound source does not exist at any one of the examination directions, the circuitry selects one of the examination directions where a signal level of sound becomes the smallest level from the plurality of the examination directions.

3. The acoustic signal processing apparatus of claim 1, wherein the circuitry further removes the noise signal from the effective signal.

4. The acoustic signal processing apparatus of claim 1, wherein the circuitry calculates the feature for the first examination direction based on the effective signal generated for the first examination direction, and the effective signal generated for the second examination direction.

5. The acoustic signal processing apparatus of claim 1, wherein the circuitry calculates the feature of each one of the examination directions based on a frequency component of the effective signal that is set less than a first frequency, the first frequency being set based on an installation interval of the plurality of sound receivers.

6. The acoustic signal processing apparatus of claim 1, wherein the feature calculated by the circuitry includes a plurality of features for each one of the examination directions.

7. The acoustic signal processing apparatus of claim 6, wherein when a change rate of the feature calculated for a current processing with respect to the feature calculated for a most-recent processing is less than a threshold, the circuitry averages the feature of the current processing, and selects the target direction based on the averaged feature of the current processing.

8. The acoustic signal processing apparatus of claim 1, wherein each of the sound receivers is an omnidirectional microphone.

9. A method of processing an acoustic signal, the method comprising,
receiving acoustic signals of a plurality of channels from a plurality of sound receivers when the plurality of sound receivers receives sound coming from a plurality of examination directions in a space;
generating an effective signal corresponding to sound coming from each one of the examination directions based on the acoustic signals of the plurality of channels for each one of the examination directions;

calculating a feature for each one of the examination directions based on the effective signal generated for each one of the examination directions; and selecting a target direction from the plurality of examination directions in the space based on the feature calculated for each one of the examination directions, wherein the plurality of examination directions includes a first examination direction, and at least one other examination direction including a second examination direction different from the first examination direction, and wherein when the generating generates the effective signal for the first examination direction, the generating generates a noise signal for the first examination direction based on acoustic signals corresponding to sound coming from the second examination direction, and then the calculating calculates the feature for the first examination direction based on the effective signal and the noise signal generated for the first examination direction.

10. A non-transitory storage medium storing a program that, when executed by a computer, causes the computer to execute a method of processing an acoustic signal, the method comprising, receiving acoustic signals of a plurality of channels from a plurality of sound receivers when the plurality of sound receivers receives sound coming from a plurality of examination directions in a space;

generating an effective signal corresponding to sound coming from each one of the examination directions based on the acoustic signals of the plurality of channels for each one of the examination directions;

calculating a feature for each one of the examination directions based on the effective signal generated for each one of the examination directions; and selecting a target direction from the plurality of examination directions in the space based on the feature calculated for each one of the examination directions, wherein the plurality of examination directions includes a first examination direction, and at least one other examination direction including a second examination direction different from the first examination direction, and wherein when the generating generates the effective signal for the first examination direction, the generating generates a noise signal for the first examination direction based on acoustic signals corresponding to sound coming from the second examination direction, and then the calculating calculates the feature for the first examination direction based on the effective signal and the noise signal generated for the first examination direction.

* * * * *